United States Patent
Feinberg et al.

(10) Patent No.: US 10,318,583 B2
(45) Date of Patent: Jun. 11, 2019

(54) SYSTEMS AND METHODS FOR RECOMMENDING RELATIONSHIPS WITHIN A GRAPH DATABASE

(71) Applicant: Stanford University, Palo Alto, CA (US)

(72) Inventors: Evan Feinberg, Palo Alto, CA (US); Julien Clancy, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 180 days.

(21) Appl. No.: 14/212,222

(22) Filed: Mar. 14, 2014

(65) Prior Publication Data

US 2014/0280224 A1   Sep. 18, 2014

Related U.S. Application Data

(60) Provisional application No. 61/793,289, filed on Mar. 15, 2013.

(51) Int. Cl.
*G06F 16/901* (2019.01)

(52) U.S. Cl.
CPC ............... *G06F 16/9024* (2019.01)

(58) Field of Classification Search
CPC ......... G06F 17/30958; G06F 17/30961; G06F 17/278; G06F 2207/025; G06F 16/24578;
(Continued)

(56) References Cited

U.S. PATENT DOCUMENTS 5,748,844 A   5/1998 Marks
5,920,859 A   7/1999 Li
(Continued)

FOREIGN PATENT DOCUMENTS

WO   2014143878 A1   9/2014

OTHER PUBLICATIONS

Brin et al., "The anatomy of a large-scale hypertextual Web search engine", Computer Networks and ISDN Systems, 1998, vol. 30, 20 pgs.
(Continued)

*Primary Examiner* — Tony Mahmoudi
*Assistant Examiner* — Linh Black
(74) *Attorney, Agent, or Firm* — KPPB LLP

(57) ABSTRACT

Systems and methods for relationship recommendations systems in accordance with embodiments of the invention are illustrated. In one embodiment, a relationship recommendation server system includes a processor wherein a relationship recommendation program configures the processor to obtain a graph database including a set of nodes including node attribute data and a set of edges including edge attribute data and describing relationships between nodes in the set of nodes, determine a set of motif data, where the motif data describes at least one subgraph including a subset of the nodes and a subset of the edges within the graph database, obtain a search node, generate additional edges between the search node and a subset of the nodes within the graph database, where the additional edges form subgraphs including the search node that are isomorphic to a subset of the motif data, and recommend relationships based on the generated additional edges.

20 Claims, 7 Drawing Sheets

(58) Field of Classification Search
CPC ............... G06F 16/9024; G06F 16/334; G06F 16/3331; G06K 9/6255; G06K 9/6892; G06K 9/6227; H04N 21/4782; Y10S 707/99936; Y10S 707/99933; Y10S 707/99937; Y10S 930/31; G06N 20/00; H04L 51/18
USPC .................................. 707/798, 805, 748, 771
See application file for complete search history.

(56) References Cited

U.S. PATENT DOCUMENTS

| | | | |
|---|---|---|---|
| 6,014,678 A | 1/2000 | Inoue et al. | |
| 6,285,999 B1 | 9/2001 | Page | |
| 6,816,585 B1 | 11/2004 | Blatt et al. | |
| 7,624,448 B2* | 11/2009 | Coffman | G06F 21/552 726/22 |
| 8,347,237 B2 | 1/2013 | Bier et al. | |
| 8,386,495 B1 | 2/2013 | Sandler et al. | |
| 8,396,884 B2* | 3/2013 | Singh | G06F 16/9024 707/760 |
| 9,137,110 B1* | 9/2015 | Adogla | H04L 41/082 |
| 2006/0235841 A1 | 10/2006 | Betz et al. | |
| 2007/0239694 A1* | 10/2007 | Singh | G06F 17/30958 |
| 2008/0010281 A1 | 1/2008 | Berkhin et al. | |
| 2008/0247674 A1* | 10/2008 | Walch | G06K 9/344 382/305 |
| 2009/0043790 A1* | 2/2009 | Holster | G06F 17/30961 |
| 2009/0043797 A1* | 2/2009 | Dorie | G06F 17/3071 |
| 2009/0216820 A1* | 8/2009 | Eusterbrock | G06F 17/10 708/270 |
| 2009/0222435 A1 | 9/2009 | Andersen et al. | |
| 2009/0324107 A1* | 12/2009 | Walch | G06K 9/00872 382/224 |
| 2010/0211924 A1* | 8/2010 | Begel | G06F 8/74 717/101 |
| 2011/0173189 A1* | 7/2011 | Singh | G06F 17/30958 707/722 |
| 2012/0054206 A1* | 3/2012 | Franks | G06F 16/3347 707/750 |
| 2012/0102021 A1* | 4/2012 | Hill | G06F 17/30964 707/711 |
| 2012/0102045 A1* | 4/2012 | Cucerzan | G06F 17/278 707/748 |
| 2012/0143875 A1* | 6/2012 | Sarma | G06F 17/30687 707/746 |
| 2012/0221581 A1 | 8/2012 | Narayanan et al. | |
| 2012/0296923 A1 | 11/2012 | Iwama et al. | |
| 2012/0330864 A1 | 12/2012 | Chakrabarti et al. | |
| 2013/0159310 A1* | 6/2013 | Birdwell | G06F 17/30442 707/737 |
| 2013/0191416 A1* | 7/2013 | Lee | G06F 17/30979 707/771 |
| 2014/0122228 A1* | 5/2014 | Wical | G06Q 30/02 705/14.53 |
| 2014/0289323 A1* | 9/2014 | Kutaragi | G06Q 50/01 709/203 |

OTHER PUBLICATIONS

Coifman et al., "Geometric diffusions as a tool for harmonic analysis and structure definition of data: Diffusion maps", PNAS, May 24, 2005, vol. 102, No. 21, pp. 7426-7431.

International Search Report and Written Opinion for International Application PCT/US14/28035, report completed Jul. 17, 2014, dated Aug. 19, 2014, 9 pages, dated Aug. 19, 2014.

International Preliminary Report on Patentability for International Application PCT/US2014/028035, Report dated Sep. 15, 2015, dated Sep. 24, 2015, 8 Pgs.

Coifman et al., "Diffusion maps", Applied and Computational Harmonic Analysis, vol. 21, No. 1, Jul. 2006, Available online Jun. 19, 2006, pp. 5-30.

Easley et al., "Networks, Crowds, and Markets: Reasoning about a Highly Connected World", Cambridge University Press, 2010, Draft Version: Jun. 10, 2010, Retrieved from: http://www.cs.cornell.edu/home/kleinber/networks-book/networks-book.pdf, 242 pgs (part 1 of 3).

Easley et al., "Networks, Crowds, and Markets: Reasoning about a Highly Connected World", Cambridge University Press, 2010, Draft Version: Jun. 10, 2010, Retrieved from: http://www.cs.cornell.edu/home/kleinber/networks-book/networks-book.pdf, 252 pgs (part 2 of 3).

Easley et al., "Networks, Crowds, and Markets: Reasoning about a Highly Connected World", Cambridge University Press, 2010, Draft Version: Jun. 10, 2010, Retrieved from: http://www.cs.cornell.edu/home/kleinber/networks-book/networks-book.pdf, 339 pgs (part 3 of 3).

Ma et al., "Mining Social Networks Using Hear Diffusion Processes for Marketing Candidates Selection", CIKM 2008, Oct. 26-30, 2008, Napa Valley, CA, Retrieved from: http://www.cse.cuhk.edu.hk/~lyu/paper_pdf/Heat%20Diffusion-ma.pdf, pp. 233-242.

Nallapati et al., "TopicFlow Model: Unsupervised Learning of Topic-specific Influences of Hyperlinked Documents", Proceedings of the 14th International Conference on Artificial Intelligence and Statistics (AISTATS) 2011, Fort Lauderdale, FL, vol. 15, pp. 543-551.

Ramage, Daniel, "Studying People, Organizations, and the Web with Statistical Text Models", Dissertation, Stanford University, Department of Computer Science, Dec. 2011, Retrieved from: https://nlp.stanford.edu/~manning/dissertations/Ramage-Dan-thesis-final-augmented.pdf, 178 pgs.

Yang et al., "Community-Affiliation Graph Model for Overlapping Network Community Detection", 2012 IEEE 12th International Conference on Data Mining, Dec. 10-13, 2012, Brussels, Belgium, Retrieved from: https://cs.stanford.edu/people/jure/pubs/agmfit-icdm12.pdf, 10 pgs.

* cited by examiner

SYSTEMS AND METHODS FOR RECOMMENDING RELATIONSHIPS WITHIN A GRAPH DATABASE

CROSS-REFERENCE TO RELATED APPLICATIONS

The current application claims priority to U.S. Provisional Patent Application Ser. No. 61/793,289, filed Mar. 15, 2013, the disclosure of which is hereby incorporated by reference in its entirety.

FIELD OF THE INVENTION

The present invention relates to systems and methods for augmenting graph databases and more specifically to the identification of relationships that can be used to augment a graph database.

BACKGROUND

The Internet is an influential mechanism for disseminating information between a variety of individuals and organizations. With the proliferation of blogs, forums, and online social networking sites such as the Facebook service provided by Facebook, Inc. of Menlo Park, Calif. and the Twitter service provided by Twitter, Inc. of San Francisco, Calif., news and information is being created by both professional news outlets and from ordinary people. Many of these sites provide user profiles giving users the ability to create relationships with other users of a particular site. Once a relationship has been established, news and other communications can be shared from one user to some or all of the users having a relationship with the user.

Additionally, a variety of academic databases are available via the Internet. Many of these databases are targeted toward a specific academic area, such as the IEEE Xplore database service provided by the IEEE of New York, N.Y., while other databases encompass multiple disciplines, such as the Web of Science service provided by Thomson Reuters of New York, N.Y. These academic databases include a bibliographic listing of a variety of academic publications (e.g. research papers and other publications) related to a variety of topics. Many academic databases include digital copies of the academic publications and/or a reference to a library containing physical copies of the academic publications. Bibliographic information for an academic publication includes a listing of the authors of the academic publication. Many academic databases include a listing of academic publications referenced by a particular academic publication.

In computing, a graph is an abstract data structure including nodes and edges. A graph contains a set of nodes connected by one or more edges. Values can be associated with the nodes and/or the edges. A graph data structure is an implementation of the mathematical concept of a graph, which is a representation of a set of objects with some pairs of the objects connected by links. Graphs may be undirected, where an edge indicates a relationship between two nodes within the graph. Graphs can be directed, where an edge indicates a relationship between a first node and a second node within the graph, but not the corresponding relationship between the second node and the first node.

SUMMARY OF THE INVENTION

Systems and methods for relationship recommendations systems in accordance with embodiments of the invention are illustrated. In one embodiment, a relationship recommendation server system includes a processor and a memory connected to the processor and configured to store a relationship recommendation program, wherein the relationship recommendation program configures the processor to obtain a graph database where the graph database includes a set of nodes including node attribute data and a set of edges including edge attribute data and edges in the set of edges describe relationships between nodes in the set of nodes, determine a set of motif data, where the motif data describes at least one subgraph including a subset of the nodes and a subset of the edges within the graph database, obtain a search node, generate additional edges between the search node and a subset of the nodes within the graph database, where the additional edges form subgraphs including the search node that are isomorphic to a subset of the motif data, and recommend relationships based on the generated additional edges.

In an additional embodiment of the invention, the relationship recommendation application further configures the processor to augment the graph database by incorporating a portion of the additional edges into the set of edges.

In another embodiment of the invention, the relationship recommendation server system further includes a network interface connected to the processor and configured to communicate via a network and the relationship recommendation application further configures the processor to obtain source data using the network interface, where the source data describes a collaborative environment including a set of entities and a set of relationships describing the relationships between the entities in the set of entities.

In yet another additional embodiment of the invention, the relationship recommendation application further configures the processor to generate the graph database based on the obtained source data by generating a set of node data based on the set of entities in the source data, generating a set of edge data based on the set of relationships in the source data, where an edge in the set of edge data includes a relationship between nodes in the set of node data, and creating a graph database including the set of node data and the set of edge data.

In still another additional embodiment of the invention, the wherein the relationship recommendation application further configures the processor to augment the graph database based on the obtained source data by generating a set of additional node data based on the set of entities in the source data, generating a set of additional edge data based on the set of relationships in the source data, where an edge in the set of additional edge data includes a relationship between nodes, and incorporating the set of additional node data and the set of additional edge data into the obtained graph database.

In yet still another additional embodiment of the invention, the relationship recommendation application configures the processor to determine a set of motif data by determining a set of subgraphs of the graph database, identifying a subset of the set of subgraphs occurring with a frequency exceeding a threshold value, and utilizing the identified subset of subgraphs as the motif data.

In yet another embodiment of the invention, the threshold value is based on the statistical significance of the occurrence of the subset of the set of subgraphs within the graph database.

In still another embodiment of the invention, the relationship recommendation application configures the processor to identifying a subset of the set of subgraphs occurring with a frequency exceeding a threshold value by calculating the frequency the subgraphs in the set of subgraphs occurs within the graph database, calculating the frequency the subgraphs in the set of subgraphs occurs within a training graph database separate from the graph database, and determining the statistical significance of the subgraphs in the set of subgraphs based on the frequency the subgraphs occur within the graph database, the training graph database, and the standard deviation of the occurrences.

In yet still another embodiment of the invention, the relationship recommendation application configures the processor to identify subgraphs within the graph database that are isomorphic to the motif data and include the isomorphic subgraphs within the motif data.

In yet another additional embodiment of the invention, the relationship recommendation application configures to identify subgraphs isomorphic to a piece of motif data by generating isomorphic node data based on the attributes of the nodes within the subgraph, generating isomorphic edge data based on the attributes of the edge within the subgraph, generating isomorphic motif node data based on the attributes of the nodes within the piece of motif data, generating isomorphic motif edge data based on the attributes of the edges within the piece of motif data, and generating a similarity score for the subgraphs relative to the piece of motif data based on the isomorphic node data, the isomorphic edge data, the isomorphic motif node data, and the isomorphic motif edge data.

In still another additional embodiment of the invention, the identification of a subgraph included in the set of subgraphs is based on the similarity score and a statistical significance of the subgraph within the graph database.

In yet still another additional embodiment of the invention, the relationship recommendation application further configures the processor to rank the subgraphs generated based on the search node and the additional edges and recommend those relationships corresponding to the additional edges forming subgraphs have a rank exceeding a threshold value.

In yet another embodiment of the invention, the relationship recommendation application configures the processor to rank a subgraph based on the attributes of the set of node data and the attributes of the set of edge data for the set of node data and the set of edge data in the subgraph.

In still another embodiment of the invention, the recommended relationship corresponds to the subgraph having the highest rank.

In yet still another embodiment of the invention, the relationship recommendation application further configures the processor to identify a representative node within the graph database, where a representative node corresponds to a subgraph occurring within the graph database, and a portion of the motif data includes subgraphs including the representative node.

In yet another additional embodiment of the invention, the representative node includes a set of representative edges between the representative node and a subset of the nodes within the subgraph corresponding to the representative node and the recommended relationships include relationships between the source node and a node within the subgraph corresponding to the representative node based on the set of representative edges.

In still another additional embodiment of the invention, the recommended relationships include at least one relationship between the source node and the representative node.

Yet another embodiment of the invention includes a method for recommending relationships including obtaining a graph database using a relationship recommendation server system where the graph database includes a set of nodes including node attribute data and a set of edges including edge attribute data and edges in the set of edges describe relationships between nodes in the set of nodes, determining a set of motif data using the relationship recommendation server system, where the motif data describes at least one subgraph including a subset of the nodes and a subset of the edges within the graph database, obtain a search node using the relationship recommendation server system, generating additional edges between the search node and a subset of the nodes within the graph database using the relationship recommendation server system, where the additional edges form subgraphs including the search node that are isomorphic to a subset of the motif data, and recommending relationships based on the generated additional edges using the relationship recommendation server system.

In still another additional embodiment of the invention, the method further includes obtaining source data using the relationship recommendation server system, where the source data describes a collaborative environment including a set of entities and a set of relationships describing the relationships between the entities in the set of entities and generating the obtained graph database based on the obtained source data using the relationship recommendation server system.

In yet still another additional embodiment of the invention, the method further includes determining a set of motif data by determining a set of subgraphs of the graph database using the relationship recommendation server system, identifying a subset of the set of subgraphs occurring with a frequency exceeding a threshold value using the relationship recommendation server system, and utilizing the identified subset of subgraphs as the motif data using the relationship recommendation server system.

In yet another embodiment of the invention, the method further includes ranking the subgraphs generated based on the search node and the additional edges using the relationship recommendation server system and recommending those relationships corresponding to the additional edges forming subgraphs have a rank exceeding a threshold value using the relationship recommendation server system.

In still another embodiment of the invention, the method further includes identifying a representative node within the graph database using the relationship recommendation server system, where a representative node corresponds to a subgraph occurring within the graph database and a portion of the motif data includes subgraphs including the representative node.

DETAILED DISCLOSURE OF THE INVENTION

Figure 1:
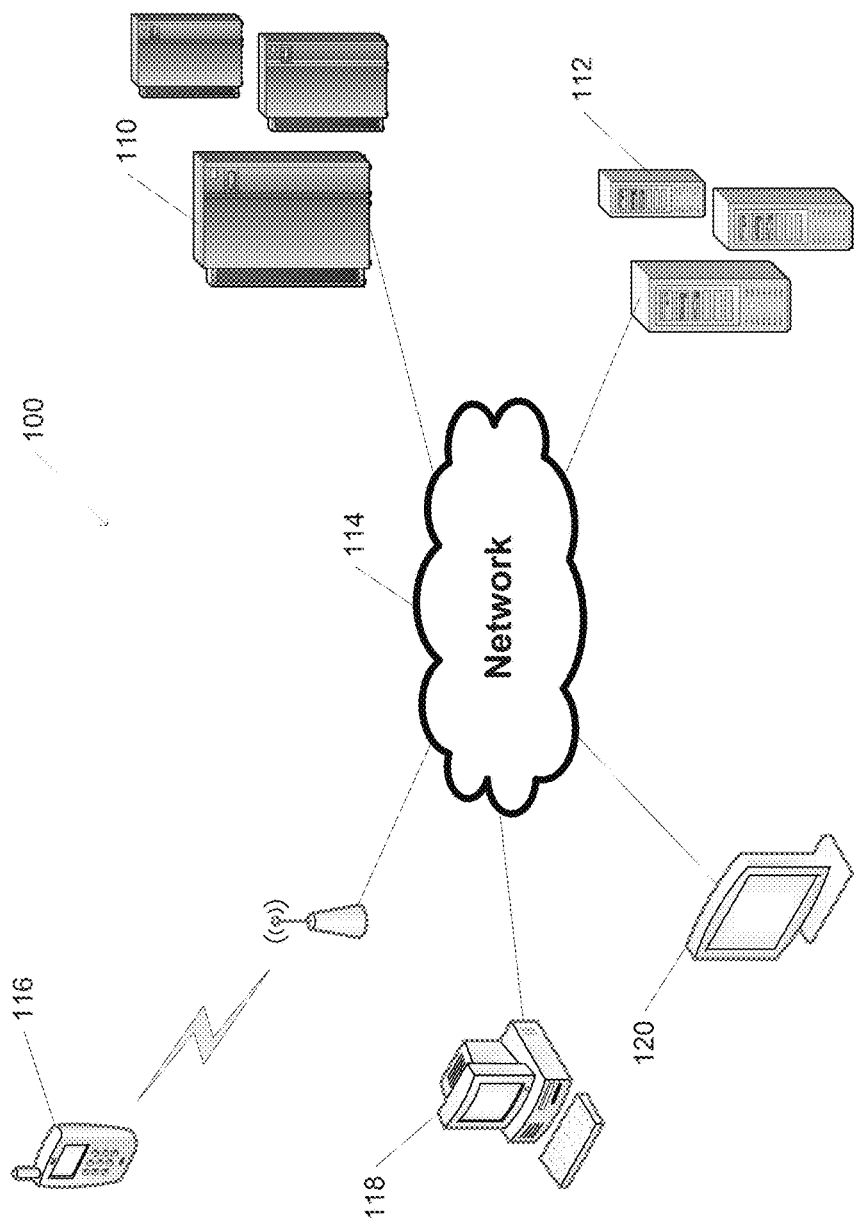
FIG. 1 is a network diagram of a relationship recommendation system in accordance with an embodiment of the invention.

Turning now to the drawings, relationship recommendation systems in accordance with embodiments of the invention are illustrated. Collaboration has become increasingly important in the domain of scientific research. In particular, interdisciplinary research, the act of conducting investigation that integrates more than one field, has shown immense promise to open unforeseen windows of discovery. Data from the National Science Foundation and other sources illustrate the rise of the co-authorship index that indicates that collaboration has become increasingly common in the scientific community. Interdisciplinary research has formed the basis of some of the most innovative advances in recent memory. One of the greatest examples has been the convergence of microfluidics engineers, computer scientists, and clinical doctors in developing tools to subtype human disease, leading to marked improvements in outcomes of diagnosis and treatment of cancer and other illnesses. Unfortunately, such fruitful partnerships often come about by serendipitous encounters at conferences or chance introductions through mutual colleagues. While efforts have been made to engender "automatic serendipity," or systems that can predict productive scientific partnerships based on existing data, none has shown to be particularly successful or have gained significant adoption. Science that breaks traditional boundaries between fields holds boundless potential to make a positive impact on our world.

Collaboration occurs in a wide range of contexts, from collaboration between people and/or entities to interactions between genes toward a common goal. For example, online social networks allow users and companies to share a variety of information, from status updates to targeted advertising, to the users' contacts and to the public at large. Similarly, research commonly occurs in teams (i.e. research groups), many of which span a plurality of disciplines, universities, and/or private companies. Networks of collaborators are also becoming increasingly important in the field of biomedicine, as scientists have increasingly mapped protein and gene interaction networks, forming the interactome for various species. The academic publications and products created by these teams typically have multiple authors and other collaborators. Relationship recommendation systems in accordance with embodiments of the invention are configured to obtain or otherwise generate a graph database having nodes, edges, and attributes describing the users and relationships of one or more collaborative environments such as an online social network and/or a research environment. For example, for an online social network, the nodes of a graph database represent the users of the online social network and the edges represent a connection (e.g. "friends") between users. Similarly, for a graph database representing a research environment, the nodes can represent individual researchers while the edges represent collaboration (e.g. co-authorship) between researchers.

A graph database for a particular collaborative environment can represent a variety of relationships between entities. For example, social networks can spawn an interaction graph where nodes are users and edges represent situations where a user has engaged in a conversation with another user (e.g. through "commenting" on "posts"), while research networks can spawn directed citation graphs where nodes are either authors or papers who have referenced each other and professional networks can spawn graphs of professionals who have collaborated on projects or worked in the same groups at companies. Attributes and other metadata describing the nodes and/or edges can be used by the relationship recommendation system to determine productivity metrics associated with the nodes and the relationships between the nodes. In a variety of embodiments, the attributes and metadata are generated based on bibliography or other metadata taken from an information source. The bibliographic information can include, but is not limited to, authors, incoming citations, outgoing references and can be employed to form attributes and metadata describing co-authorship, collaboration, citation, and other networks. For example, in a research environment, the attributes of a given node (i.e. researcher) could include that researcher's research interests, academic pedigree, level of impact, geographic location, university affiliations, grants obtained, and/or any other pertinent metadata as appropriate to the requirements of specific embodiments of the invention. Similarly, the attributes for an edge can include data describing the relationship between the nodes. Additionally, attributes can be generated based on information obtained from third-party information sources. In many embodiments, the third-party information sources contain information related the entity represented by a particular node, the relationship represented by a particular edge, and/or the attribute data associated with the nodes and/or edges.

Based on the nodes, edges, and the attributes of the nodes and edges, relationship recommendation systems can determine productive (e.g. beneficial) relationship patterns (i.e. subgraphs) within the graph database. In several embodiments, these beneficial relationship patterns are known as motifs. In several embodiments, a motif in a given graph database is defined as a substructure that occurs with a statistically significantly higher frequency when compared to a random graph with the same number of edges and nodes. These motifs can be ranked by their productivity as defined by different possible metrics. Given a search node (either within the graph database or a new node to be added), the relationship recommendation system can identify additional edges (i.e. potential relationships) with other nodes in the graph database based on the motifs. In this way, the additional edges suggested improve the structure of the graph database in the sense that beneficial relationship structures are created. In a variety of embodiments, the additional edges create a subgraph within the graph database that is isomorphic to an identified motif. Concept description data can be provided that includes keywords and concepts of a particular problem to be solved by identifying a subgraph of the graph database that fulfills the problem. In several embodiments, the keywords and concepts are mapped to the attributes describing the nodes and edges within the graph database in order to identify the relevant subgraphs. For example, the relationship recommendation system can be employed to combine topic modeling and/or natural language processing for a particular concept description (i.e. a function describing anything represented by the graph database, such as a potential project for a research environment or an advertising strategy for an online social network) with a set of identified motifs and a source node to determine a "team" of nodes (e.g. a subgraph isomorphic to at least one of the identified motifs according to a similarity scoring function) that will be most likely to form a productive solution to the concept description. Taking the previous examples, this team of nodes can represent a team of researchers likely to have a productive collaboration for a particular research project or a user likely to virally distribute an advertisement for a particular brand. In this way, the nodes and edges having attributes corresponding to the keywords and concepts within the concept description data can be selected and augmented to create subgraphs isomorphic to the motifs identified as likely to provide a constructive solution to the problem posed by the concept description data.

In many embodiments, a similarity score is utilized to identify subgraphs and motifs within the graph database that are isomorphic to each other; that is, to identify subgraphs and motifs having different but equivalent structures (i.e. the configuration of the nodes and edges within the motif) within the graph database. In a variety of embodiments, the similarity score is based on one or more attributes identified as relevant to a particular function (i.e. concept description data) that is the subject of the relationship recommendation process. For example, a graph database with nodes representing researchers (with certain attributes, for instance location and field of research) and edges representing connections between those researchers (for instance, an edge is present if two researchers have coauthored a paper, with an attribute denoting how many times they have collaborated). In this case, given a subgraph of the graph database, a function of the subgraph can be the number of papers whose co-authorship is contained within the subgraph. The relationship recommendation system can then identify which patterns of researchers tend to collaborate, identify those collaborations that are productive, and determine a set of edges between researchers based on those motifs within the graph database indicative of a likelihood of a fruitful collaboration, measure by a success metric. Success metrics include, but are not limited to, successful academic publications, citations accrued, grant dollars obtained, or any other metric appropriate to the specific requirements of application of the invention. In this example, the most relevant attribute could represent field of study, and with the difference between the fields of study being the similarity score in the identification of motifs. The similarity score is valuable in identifying subgraphs approximating motifs, i.e. whether or not the generation of a new edge will form a subgraph that is structurally isomorphic to but may have slightly differing attributes from an existing motif. This difference can be used in the generation of subgraphs isomorphic to the identified motifs by augmenting the subgraph of the graph database with a set of edges and/or a set of nodes having the desired attributes. By way of example, assume that in a graph database representing a scientific network, combinations of a computer scientist, a physician, and a microfluidics engineer may occur both frequently and have a relatively high chance of yielding academic publications with a high degree of impact in the community. The relationship recommendation system can identify this motif based on the attributes of the nodes and edges within the graph database and utilize that motif, identify potential subgraphs that are isomorphic to that motif, and suggest the nodes or edges (e.g. the researchers or collaborations) that would result in the desired combination (e.g. a subgraph isomorphic to an identified motif) being added to the graph database.

In several embodiments, a graph database contains one or more representative nodes that encompass one or more subgraphs within the graph database. The representative nodes can also be generated for a particular subgraph. These representative nodes can be utilized to identify potential relationships with a target search node by abstracting the relationship with each node within the subgraph. In many embodiments, the identified motifs are based on the relationships between the representative nodes within the graph database. In this way, the representative nodes can be utilized to augment the graph database in the determination of subgroups isomorphic to the motifs based on the representative nodes. Additionally, the representative nodes can be utilized to suggest additional relationships in that, for a search node, if a beneficial relationship is established with a representative node, it is likely that at least one node associated with the representative node will have a beneficial relationship with the search node. In this way, multiple relationships can be suggested based on the identified relationship between the search node and the representative node.

Although the systems and methods described herein incorporate techniques for identifying productive (e.g. beneficial) motifs and suggesting edges and/or nodes that increase the number of productive motifs within the graph database, any techniques, including those that identify unproductive motifs and provide recommendations for edges and/or nodes that have negative connotations, can be utilized as appropriate to the requirements of specific applications in accordance with embodiments of the invention. Additionally, any of the various processes described herein can be performed in alternative sequences and/or in parallel (on different computing devices) in order to achieve similar results in a manner that is more appropriate to the requirements of a specific application.

Relationship Recommendation Systems

As collaboration becomes increasingly important in a variety of collaborative communities, from the science laboratory to founding new ventures, relationship recommendation systems are configured to model collaborative environments. By taking as input a particular user and project description, relationship recommendation systems utilize models of the collaborative environment to generate suggestions for teams that can successfully translate the project description to reality. For instance, a scientist could write an abstract describing a proposed drug delivery method, and the relationship recommendation system would output a list of scientists, physicians, and regulatory experts that form a team capable of translating the idea from the desktop, to the laboratory bench, and ultimately to the clinic and boardroom. Likewise, a prospective startup founder could input a company idea into this application and be returned an ideal list of associates for creating a profitable venture based on the idea description.

A relationship recommendation system in accordance with an embodiment of the invention is illustrated in FIG. 1. The relationship recommendation system 100 includes a relationship recommendation server system 110 configured to store a graph database. In many embodiments, the relationship recommendation server system 110 is configured to communicate with an information source 112 and/or a plurality of client devices via a network 114. In several embodiments of the invention, the network 114 is a local area network, a wide area network, or the Internet; however, any network 114 can be utilized as appropriate to the requirements of specific applications in accordance with embodiments of the invention. In a number of embodiments, the relationship recommendation server system 110 is a cluster of computing devices configured as a distributed computing platform. In several embodiments, the relationship recommendation server system 110 and the information source system 112 are implemented utilizing the same server system.

In a variety of embodiments, the relationship recommendation server system 110 is configured to obtain source data describing one or more collaborative environments from an information source system 112 and generate (or augment) a graph database based on the obtained source data. The source data includes a variety of data, including entity information and relationship information along with any other metadata describing the collaborative environment, that can be utilized by the relationship recommendation server system 110 to generate nodes (representing the entities) and edges (representing the relationships) for inclusion in the graph database. Additionally, the source data can be utilized to generate the attributes of the nodes and edges within the graph database; these attributes can be utilized by the relationship recommendation server system 110 to determine motifs, similarity scores, and/or recommended relationships.

Client devices include, but are not limited to, mobile devices 116, personal computers 118, and interactive platforms 120. In a variety of embodiments, the client devices are configured to communicate with the relationship recommendation server system 110 to request and obtain recommended relationships (e.g. recommended nodes and/or edges) for a particular graph database representing a collaborative environment. In many embodiments, the client devices provide request data including concept description data describing a problem to be solved by the relationship recommendation server system 110. In several embodiments, the client devices are configured to obtain access to the graph database hosted by the relationship recommendation server system 110 via a service (such as a web service) or any other Application Programming Interface (API). In this way, the client devices can determine nodes and/or relationships beneficial to solving a particular problem utilizing techniques similar to those described herein. Likewise, the information source system 112 can utilize a service and/or API provided by the relationship recommendation server system 110 to obtain recommendations (or access the graph database to determine recommendations) in a similar manner. Similarly, an API or service provided by an information source system 112 hosting source data and/or a graph database can be utilized by the relationship recommendation server system 110 in the identification of motifs and the recommendation of relationships.

Although a specific architecture for a relationship recommendation system in accordance with an embodiment of the invention is conceptually illustrated in FIG. 1, any of a variety of architectures can also be utilized. Systems and methods for relationship recommendation server systems in accordance with embodiments of the invention are discussed in detail below.

Relationship Recommendation Server Systems

As described above, relationship recommendation server systems can be configured to identify motifs within a graph database and utilize those motifs to recommend relationships that can be utilized to improve the structure of the graph database and/or fulfill a proposed concept description. A relationship recommendation server system in accordance with an embodiment of the invention is conceptually illustrated in FIG. 2. The relationship recommendation server system 200 includes a processor 210 in communication with memory 230. The memory 230 is any form of storage configured to store a variety of data, including, but not limited to, a relationship recommendation application 232, a graph database 234 and, in many embodiments, source data 236 or representative node data 238. The relationship recommendation server system 200 also includes a network interface 220 configured to transmit and receive data over a network connection. In a number of embodiments, the network interface 220 is in communication with the processor 210 and/or the memory 230. In many embodiments, the relationship recommendation application 232, graph database 234, source data 236, and/or representative node data 238 are stored using an external server system and received by the relationship recommendation server system 200 using the network interface 220. External server systems in accordance with a variety of embodiments include, but are not limited to, information source systems.

The relationship recommendation application 232 can configure the processor 210 to perform a relationship recommendation process. In many embodiments, the relationship recommendation process includes obtaining source data 236 from an information source system and utilizing the source data 236 to create (or augment) a graph database 234. Based on the nodes, edges, and associated attributes within the graph database, the relationship recommendation process includes identifying motifs within the graph database exhibiting desired relationship patterns. Utilizing techniques similar to those described below, the relationship recommendation process proceeds by identifying a search node (either within the graph database 234 or to be added to the graph database 234), potentially based on a proposed concept description, to identify relationships between the search node and the other nodes within the graph database 234 that improve the graph database 234 based on the identified motifs. In this way, subgraphs isomorphic to the identified motifs are identified and potentially added to the graph database 234. Additionally, representative node data 238 can be utilized in the relationship recommendation process to abstract particular subsets of the graph database 234. Motifs can be determined based on these abstractions and additional relationships can be suggested based on the relationships between the representative node data 238 and the nodes within the graph database 234.

Figure 2:
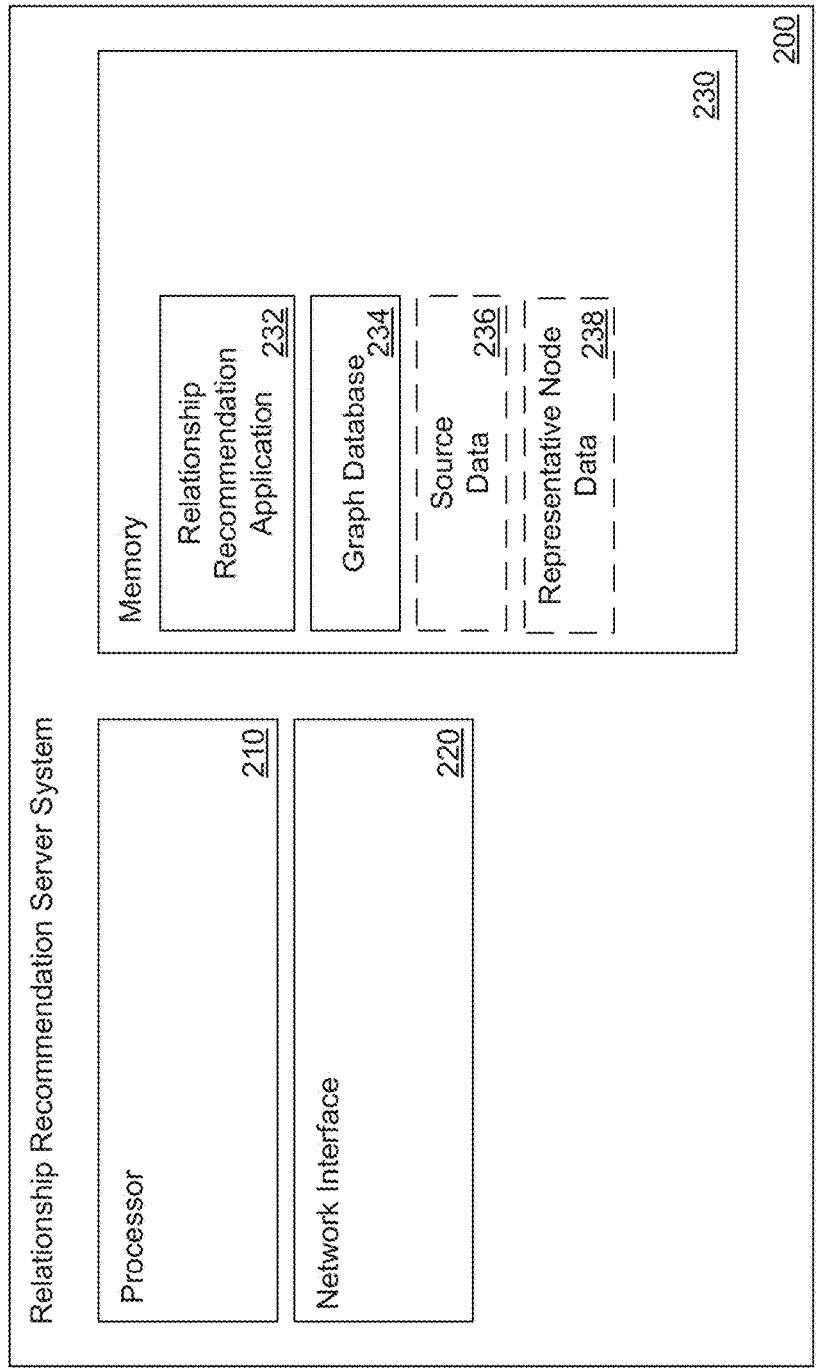
FIG. 2 is a conceptual illustration of a relationship recommendation server system in accordance with an embodiment of the invention.

A specific architecture for a relationship recommendation server system in accordance with an embodiment of the invention is conceptually illustrated in FIG. 2; however, any of a variety of architectures, including those that store data or applications on disk or some other form of storage and are loaded into memory at runtime, can also be utilized. Graph databases and techniques for recommending relationships in accordance with embodiments of the invention are discussed below.

Graph Databases

Figure 3:
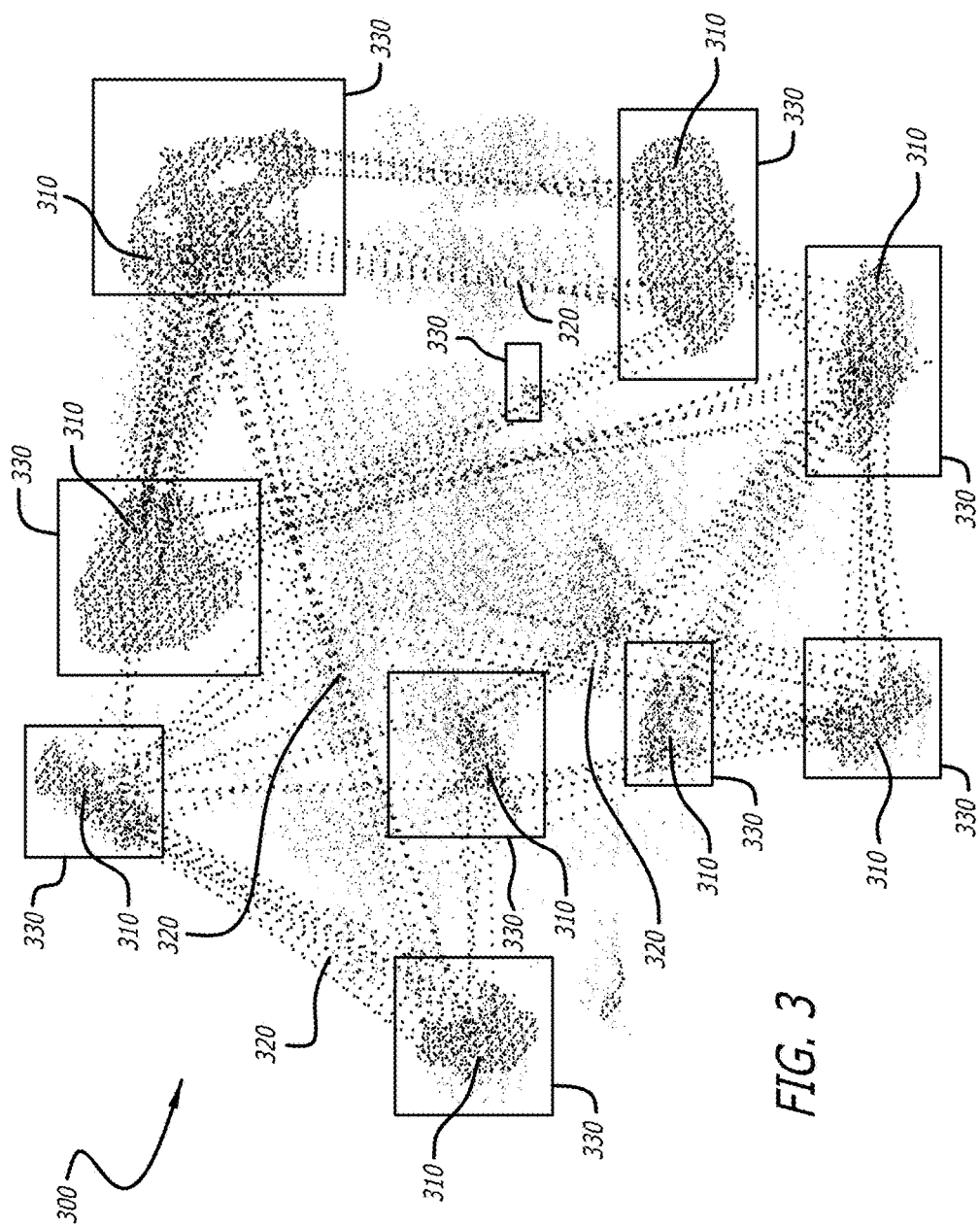
FIG. 3 is a conceptual illustration of a graph database having a plurality of relationship clusters in accordance with an embodiment of the invention.

As described above, graph databases in accordance with embodiments of the invention include a plurality of nodes and edges, where the nodes and edges have associated attribute data describing the properties of the nodes and edges. The attribute data can be utilized to identify motifs within the graph database having a particular set of properties, such as indications of productive (or unproductive) relationships between the nodes. A conceptual illustration of a graph database having sets of relationship clusters in accordance with an embodiment of the invention is shown in FIG. 3. The graph database 300 includes a set of nodes 310 connected by a set of edges 320, where a subset of the nodes and edges are grouped into sets of relationship clusters 330. It should be noted that the indicated relationship clusters 330 are illustrative but not exhaustive of relationship clusters within the graph database 300. However, it should be noted that the relationship clusters 330 can represent any grouping of nodes within the graph database and a graph database need not have any relationship clusters as appropriate to the requirements of specific applications of the invention.

The nodes 310 represent entities within a collaborative environment while the edges represent relationships between those entities. As illustrated in the graph database 300, these nodes and edges may group together into relationship clusters 330. These relationship clusters represent groups of nodes having a large number of relationships in common. For example, a relationship cluster can represent a particular research group within the academic fields represented within the collaborative environment and/or correspond to particular disciplines within the collaborative environment. Similarly, the relationship clusters 330 can represent those users with many friends in common within one or more online social networks. Representative nodes can be utilized to represent (i.e. abstract) the relationship clusters 330. The clustering of nodes into communities can be used in several ways as appropriate to the requirements of specific applications of the invention. The clusters, or communities, themselves can be determined by a variety of clustering algorithms, including spectral clustering, modularity methods, and other techniques. Once communities (i.e. fields of research or friend groups) are identified, each node in that community can be assigned an attribute denoting their membership to that community. For example, a cluster might represent all high-energy physicists and each node in that cluster would include a "high energy physics" attribute, where nodes in other clusters could have similar attributes identifying the cluster to which they belong. In a variety of embodiments, motifs in the graph database can be identified by taking into account these cluster attributes, thereby finding statistically significantly appearing motifs of nodes that may span multiple communities. For example, three-way relationships (e.g. triangle-shaped subgraphs occurring within the graph database) can be found between nodes belonging to three separate clusters. In many embodiments, first-order clustering may be used as a basis for further analysis. For example, clusters representing a certain community or communities can be extracted as a subgraph and this subgraph can be subjected to additional clustering (such as by sequential clustering techniques, topic modeling, or other distinguishing analysis) to identify higher resolution attributes (e.g., sub-fields) and/or to identify motifs within that subgraph. These higher resolution attributes can then be incorporated into the nodes to describe the multiple levels of clustering for the nodes.

Motifs within Graph Databases

Figure 4:
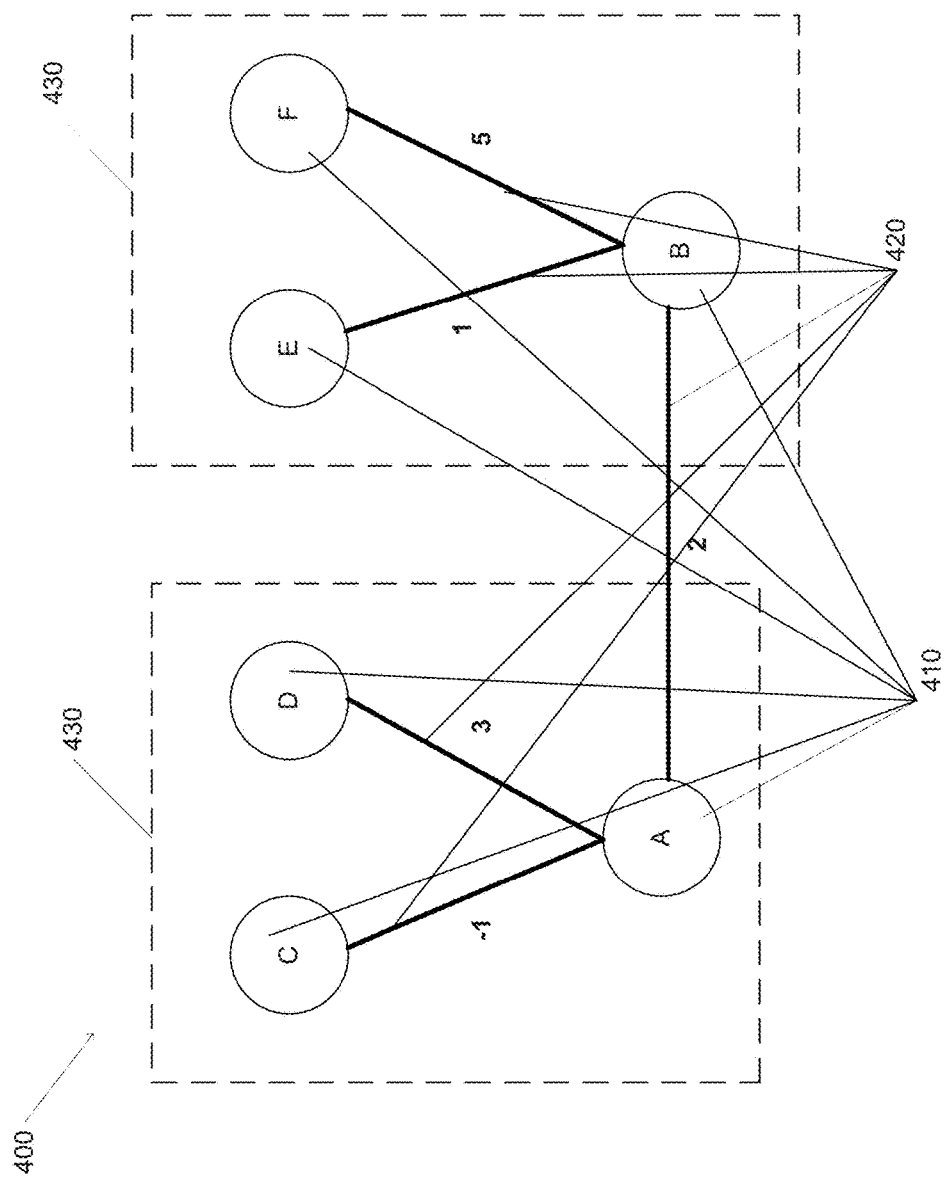
FIG. 4 is a conceptual illustration of a plurality of motifs within a graph database in accordance with an embodiment of the invention.

Turning now to FIG. 4, a graph database having a plurality of motifs in accordance with an embodiment of the invention is conceptually illustrated. The graph database 400 includes a set of nodes 410 and a set of edges 420, where the nodes 410 have the attributes 'A,' 'B,' 'C,' 'D,' 'E,' 'F' and the edges 420 have the attributes '−1', '3', '2', '1', '5.' Several motifs are indicated based on the shape of the subgraphs within the graph database 400. These motifs include two 'V' shaped motifs 430 {A, C, D} and {B, E, F}. It should be noted that, while other 'V' shaped subgraphs exist (such as {C, A, B} and {A, B, E}), for the purposes of this example we will assume that only the motifs 430 have been identified as desirable to solve a particular concept description based on the attributes of the nodes 410 and the edges 420. For example, while {A, C, D} and {E, F, B} might be isomorphic to {C, A, B}, only the former two have the set of attributes that make them productive according to a success metric. Based on the attributes of the nodes 410 and edges 420 within a particular motif, a similarity score can be determined. In many embodiments, the similarity score is also based on a particular concept description that is to be solved by suggesting nodes and/or edges based on the identified motifs. In this way, the motifs can be tailored to identify beneficial relationships for a particular problem. The similarity score can be utilized to compare and rank subgraphs occurring within the graph database. In this way, motifs identified as having positive connotations can be identified within those subgraphs, including those subgraphs that are isomorphic to a reference motif. In several embodiments, motifs having positive connotations are those that have a rank exceeding a threshold value; the threshold value can be pre-determined, determined relative to the subgraphs, or any other threshold value as appropriate to the requirements of specific applications of the invention. Additionally, other measures, including similarity scores for motifs having negative connotations (i.e. identifying poorly performing motifs so those structures can be avoided) can also be utilized as appropriate to the specific requirements of a variety of embodiments of the invention.

More formally, a motif $M \subset G$ is a subgraph that occurs with high frequency in graph database G relative to random subgraphs. In a variety of embodiments, a motif includes nodes and edges in G. However, it should be noted that the values associated with the nodes and edges within a motif need not correspond to the values within G as appropriate to the requirements of specific embodiments of the invention. In many embodiments, the statistical significance Z of a motif M is defined as:

$$Z(M) = N_{real} - N_{random}/SD$$

where $N_{real}$ is the number of times the motif occurred in G, $N_{random}$ is the number of times the motif occurred in a random graph database, and SD is the standard deviation of $N_{real}$ and $N_{random}$. Additionally, motifs may be isomorphic to each other; that is, the motifs share a common shape within a particular graph. For isomorphic motifs $$M_1 = (N_1, E_1)$$

and $$M_2 = (N_2, E_2) = (\{g(n_i) | n_i \in N_1\}, \{(g(n_i)g(u_i)) | (n_i, u_i \in E_1\})$$

for a function g and a graph database having edges E and nodes N, a similarity score d for attribute a for the motifs can be defined by various metrics and norms. As one example, one can define the similarity score d for attribute a as:

$$d_a(M_1, M_2) = \left( \sum_{n \in N_1} (a(n) - a(g(n)))^2 + \sum_{e \in E_1} (a(e) - (a(g(e)))^2 \right)^{\frac{1}{2}}$$

and $$d(M_1, M_2) = \left( \sum_a c_a d_a(M_1, M_2)^2 \right)^{\frac{1}{2}}$$

where $c_a$ is a constant for attribute a. In a number of embodiments, $c_a$ is a constant utilized to weight attributes related to the nodes and edges within the motifs.

In a variety of embodiments, alternative functions can be utilized to compute similarity scores for any two sets of nodes from structurally isomorphic subgraphs in the identification of approximations of motifs. By way of example, two subsets of nodes (e.g. two subgraphs) may have a high similarity score even while not being perfectly isomorphic by either structure or attribute. In this case, the similarity score can be framed as a discrete optimization program by calculating a similarity score pairwise by node with $n_i$ and $n_j$ corresponding to nodes in the two subsets $N_1$ and $N_2$ for the subgraphs chosen without replacement:

$$d_a(M_1, M_2) = \min_{n \in N_1} \left( \sum_{n \in N_1} (a(n) - a(g(n)))^2 + \sum_{e \in E_1} (a(e) - a(g(e)))^2 \right)^{\frac{1}{2}}$$

In this example, the function $d_a$ is minimized over all possible choices of $g(\ )$ that maps a node in $N_1$ to a node in $N_2$. Similarly, the function $d_a$ can be maximized over all possible choices of $g(\ )$ in accordance with many embodiments of the invention:

$$d_a(M_1, M_2) = \max_{i \in N_1, j \in N_2} \left( \sum_{n_i \in N_1, n_j \in N_2} (a(n_i) - a(n_j))^2 + \sum_{e_i \in E_1, e_j \in E_2} (a(e_i) - a(e_j))^2 \right)^{\frac{1}{2}}$$

However, it should be noted that in many embodiments of this invention alternative scoring systems can be employed to compute distances between two subgraphs according to the particular context in which the invention is applied. For example, in the domain of computational biology, methods relating to graph alignment, probabilistic patterns, pairwise mismatch, hidden Markov models, and log-likelihood scores can be used to ascertain the similarity of two subgraphs describing proteins or genes as nodes and edges as undirected or directed edges between them. Such methods can be easily extrapolated to a variety of domains outside of the field of computational biology and can be extended to encompass attributes in graph similarity calculations.

Although specific examples of a graph database and motifs are described above with respect to FIG. 3 and FIG. 4, any of a variety of graph databases and motifs can be utilized in accordance with embodiments of the invention. Processes for recommending potential relationships in accordance with embodiments of the invention are discussed further below.

Recommending Relationships

As described above, relationship recommendation server systems can be configured to maintain a graph database, identify motifs within the graph database, and determine nodes and/or relationships that can be utilized to augment the graph database based on the identified motifs. In a variety of embodiments, the determined nodes and/or relationships are provided to a third party, such as a client device or an information source system, as a recommended relationship. In many embodiments, the relationship recommendation process is performed in two parts: an identification stage and a recommendation stage. The relationship recommendation process is performed on a graph database G that includes a set of nodes, a set of edges, and attributes for the nodes and edges. In several embodiments, an objective function $f: S \rightarrow \mathbb{R}$, where S is a set of graphs with node sets over as described in more detail below. Additionally, the process can be performed in a supervised, unsupervised, or hybrid manner. In those embodiments utilizing supervised techniques, motifs and/or other subgraphs of the graph database are provided to facilitate the recommendation portion of the process while unsupervised techniques include identifying motifs within the graph database as part of the identification stage.

In many embodiments, the identification stage includes enumerating subgraphs of G into a list $$S = \{S_1, \ldots, S_n\}$$

with a function n where $n(S_i)$ is the number of times subgraph $S_i$ occurred in G (in several embodiments as an equivalence class) and another function $Z(S_i)$ that gives the statistical significance of $S_i$. This statistical significance can be utilized to rank the importance of $S_i$ within the graph database. That is, highly (or lowly) ranked subgraphs can be utilized as motifs utilized in the creation of highly ranked subgraphs within the graph database. As above, the graph database has attributes a over a set of edges E and a set of nodes N. These attributes are utilized to determine similarity scores for the subgraphs within the graph database.

The occurrences of a subgraph within a graph database can be expressed as a function of the attributes of the nodes and edges within the subgraph. Given $S_i$ let its occurrences in G be $$O_S = \{S_1', \ldots, S_n'\}.$$

For each node attribute a, $n \in N(S_i)$, define $$a = \mu\{a(n_i) | 0 \leq i \leq k\}$$

to be the mean of a over $O_S$ (where $n_i$ means the node n in $S_i'$) and similarly for edges as appropriate to the requirements as appropriate to specific applications of the invention. In this way, subgroups isomorphic to a particular motif can be identified according to a similarity function based on the attributes of the nodes and edges within the subgroup and the motif.

The function $f$ can be applied to each subgraph $S_i$ to determine the "relevance" (i.e. benefit) of $S_i$ (or lack thereof) within the graph database. In many embodiments, the function $f$ maps a motif or subgraph $S_i$ to a variety of productivity metrics. For example, if the source data involves citation and co-authorship networks in a scientific community, then the function $f$ can involve finding the average number of citations produced by $S_i$, the average number of citations produced by $S_i$ normalized to the attributes including $S_i$, the average PageRank of papers produced by $S_i$, the propensity of $S_i$ to influence fields of study, Topic Sensitive Page Rank, a Topic Flow Model, or any other approaches as appropriate to the requirements of specific applications of the invention. In many embodiments, $f$ is a similarity score derived based on the attributes of the nodes and edges within the subgraph similar to those similarity scores described above. In a variety of embodiments, $f$ is similar to determining the statistical significance of $S_i$. In many embodiments, the function $$f^*(S_i) = f(S_i) Z(S_i)$$

is utilized as an evaluation function for subgraphs based on the frequency the subgraph occurs within the graph database. More frequent subgraphs can be weighted more heavily (i.e. given more importance) if the statistical significance of the subgraph is more important than the similarity scores and/or the productivity scores, or vice-versa. To this end, the function $$f^*(S_i) = f(S_i) = f(S_i)^\alpha Z(S_i)^\beta$$

with $\alpha$, $\beta$ being real numbers can be utilized to rank subgraphs based on a combination of the statistical significance and the similarity and/or productivity scores of the identified subgraphs. In several embodiments, by setting $\alpha < 0$, $f$ can define what it means for a subgraph to be not beneficial (e.g. not relevant) within the graph database.

It should be noted that some or all of the subgraphs of the graph database can be utilized in the processes described above. In particular, the number of subgraphs sampled can depend on the processing power available via a relationship recommendation server system, the time available to achieve a solution, the desired accuracy of the solution, or any other metric as appropriate to the requirements in accordance with specific applications of the invention. In a number of embodiments, the subgraphs are randomly sampled from the graph database and the commonly occurring substructures (e.g. motifs) are identified not only with respect to their occurrences within graph databases $\{G_1, \ldots, G_n\}$ and similarity scores but also with a set of functions $\{f^*(G_1), \ldots, f^*(G_n)\}$ utilized to select the subgraphs. The selection of subgraphs can also depend on the structure of the subgraphs; i.e. subgraphs below or above a particular size can be excluded from the motif identification stage described above as appropriate to the requirements of particular applications of the invention.

Moving to the recommendation stage, a search node $n \in N(G)$ is obtained. The search node is utilized to identify additional edges that can be used as recommended relationships. In accordance with many embodiments of the invention, these recommended relationships result in the inclusion of one or more subgraphs isomorphic to one or more motifs within the graph database. However, it should be noted that the search node need not be contained within the graph database and the recommended relationship can include recommending nodes having particular attributes that create one or more subgraphs isomorphic to a motif identified during the identification stage. From the perspective of the search node, the graph database is augmented with edges and the resulting subgraphs created including the augmented edge are ranked according to the identified motifs. Techniques for ranking the resulting subgraphs in accordance with several embodiments of the invention are described in more detail below. Once the subgraphs have been generated by adding edges between n and some or all $$u \in N(G)$$

$$u \neq n$$

$$un \notin E(G)$$

a ranking function $rank_n$ over the nodes of G to which n is not connected can be produced describing the relative benefit (or lack thereof) of the resulting subgraphs. In a variety of embodiments, the ranking function is utilized to provide recommended relationships for a particular concept description.

Figure 5:
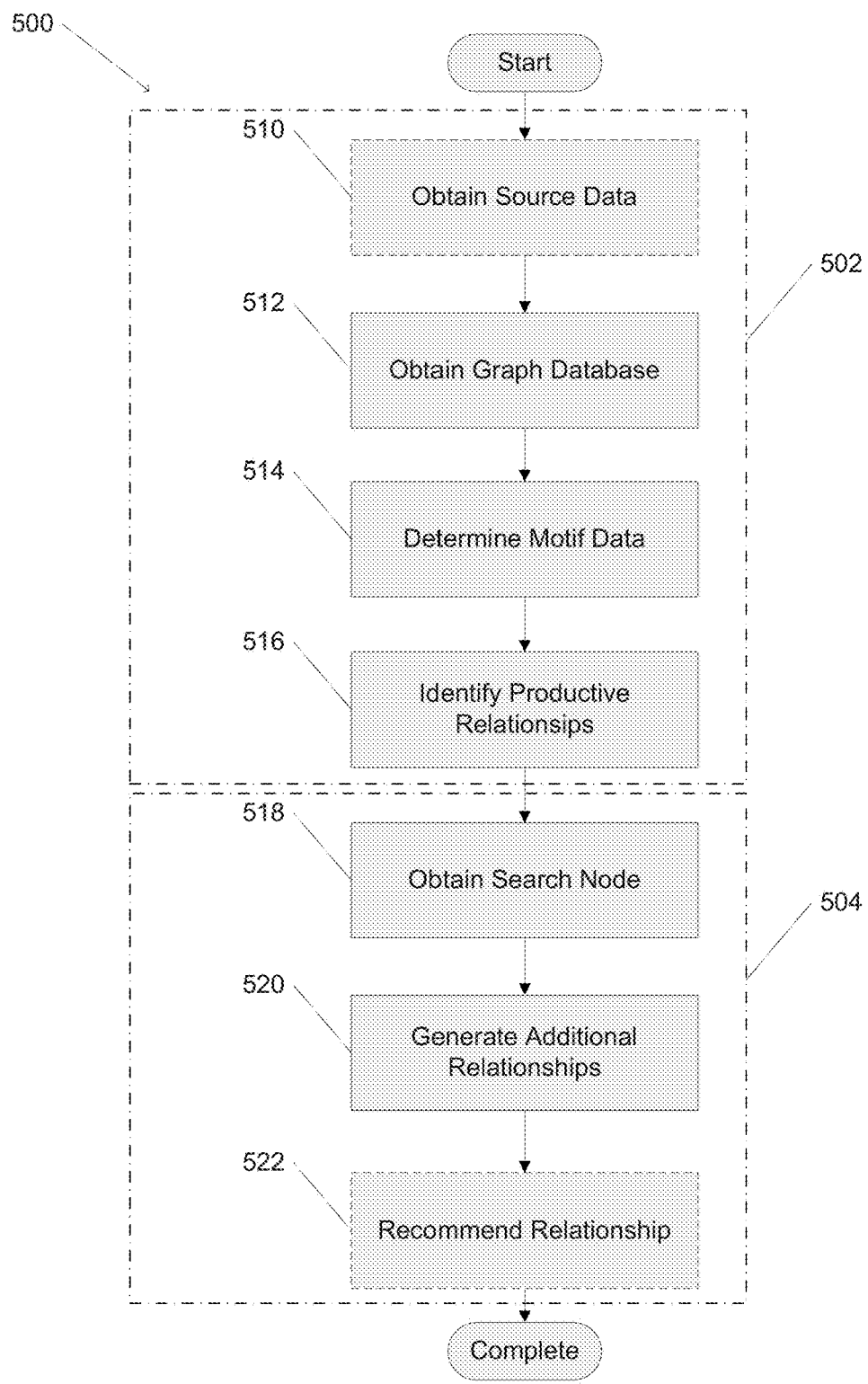
FIG. 5 is a flow chart illustrating a process for recommending relationships in accordance with an embodiment of the invention.

A process for recommending relationships within a graph database in accordance with an embodiment of the invention is illustrated in FIG. 5. The process 500 includes, in several embodiments, obtaining (510) source data. A graph database is obtained (512) and motif data describing motifs within the graph database is determined (514). As described above, a number of embodiments include generating and/or augmenting the obtained (512) graph database based on the obtained (510) source data. Productive relationships are identified (516) and a search node is obtained (518). Additional relationships are generated (520) and, in a number of embodiments, relationships are recommended (522). As described above, the process 500 can be conceptually divided into an identification stage 502 and a recommendation stage 504. However, any of the processes described above can be included in either stage, may be omitted or performed in a different order, and/or different conceptual groupings of the processes can be utilized as appropriate to the requirements of many embodiments of the invention.

Although specific processes for recommending relationships are described above with respect to FIG. 5, any of a variety of processes, including those that recommend nodes that can be incorporated into a graph database, can be utilized in accordance with embodiments of the invention. Processes for ranking potential relationships in accordance with embodiments of the invention are discussed further below.

Ranking Potential Relationships

As described above, a process for recommending relationships that improve a graph database can include identifying edges that, when added to the graph database and connecting particular nodes, result in subgraphs identified as beneficial (based on motifs identified as desirable) being created within the graph database. For a given search node n, take nodes $$u \in V(G), u \neq n$$

with $$un \neq E(G)$$

and let $G_u$ be the graph formed by adding the edge un to the graph database. Then, for subgraphs (and corresponding isomorphic subgraphs) $S_i$ with $$u, n \in N(S_i)$$

$$un \in E(S_i)$$

can be denoted as $$\{S_1^u, \ldots, S_k^u\}.$$

As motifs express common structures in the network, the function $f$ identifies which of these motifs are desirable in accordance with the requirements of specific applications of the invention. Accordingly, the edges added to the graph database for the search node are evaluated according to the motifs. In this way, if adding a particular edge would cause a subgraph isomorphic to a motif to be created, then this edge is desirable as it increases the number of desirable motifs within the graph database. In several embodiments, the condition that un occur in $S_i$ coupled with the condition that un does not occur in the graph database, the augmented graph database is equivalent to finding occurrences of $S_i$ that contain u and n and then removing those occurrences already existing within the graph database. A ranking function can then be defined using the identified subgraphs as $$rank_n(u) = \sum_i f^*(S_i^u) / d(S_i^u, S_i)$$

In a number of embodiments, non-stacking bonuses are utilized to $rank_n(u)$. In these cases, the ranking function can be expresses as $$rank_n(u) = \max_i f^*(S_i^u).$$

Figure 6:
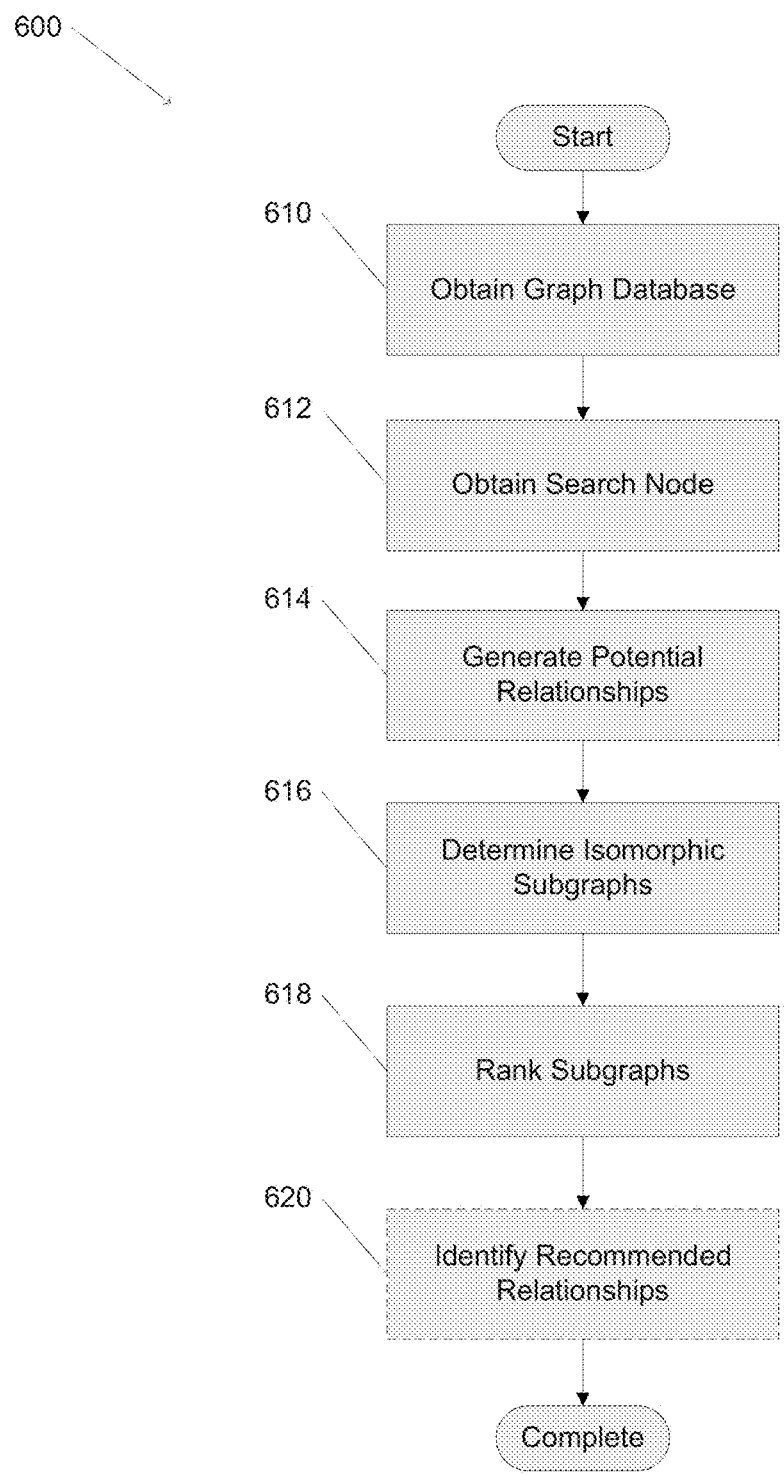
FIG. 6 is a flow chart illustrating a process for ranking potential relationships in accordance with an embodiment of the invention.

A process for identifying and recommending relationships in accordance with an embodiment of the invention is illustrated in FIG. 6. The process 600 includes obtaining (610) a graph database and obtaining (612) a search node. Potential relationships are generated (614) and isomorphic subgraphs are determined (616). Subgraphs are ranked (618) and, in several embodiments, recommended relationships are identified (620).

Specific processes for identifying and recommending relationships are described above with respect to FIG. 6; however, any of a variety of processes, including those that recommend nodes to be added to the graph database, can be utilized in accordance with embodiments of the invention. Processes for ranking potential relationships using representative nodes in accordance with embodiments of the invention are discussed further below.

Ranking Potential Relationships Using Representative Nodes

Within a graph database, one or more nodes may effectively represent a subgraph within the graph database. For example, a node representing the professor in charge of a research group may effectively represent (via the relationships within the graph database) the members of the research group as a whole. Other nodes, including nodes that are generated and/or added to the graph database to represent one or more subgraphs, can be utilized as appropriate to the requirements as appropriate to specific applications of the invention. In this way, representative nodes group subgraphs by their community structure and those communities can be related in the same way as individual nodes within the graph database. Additionally, the use of representative nodes can simplify the amount of relationships (and thereby the processing power) used to determine productive subgraphs as described above. By way of an additional example, it is common in academia for there to be two entirely separate groups of people that work on similar problems but are unaware of the overlap. In one example, neuroscientists and computational mathematicians spent years attempting to solve a nearly identical problem; identifying this parallel could have led to multidisciplinary collaboration and a faster convergence to a solution. Representative nodes (and the associated attributes) can be utilized to identify those groups within the graph database and generate recommended relationships that link the groups together.

Utilizing the graph database and functions similar to those described above, certain subsets of nodes can be treated as a single node via a representative node. For each attribute a, define an amalgamation function $f_a$ that takes in all nodes in the subset and returns a composite value. For instance, one attribute could be a word frequency count among academic publications published by a research group. Representative nodes can also be utilized to generate additional recommended relationships once a recommended relationship has been identified. For example, it is common in academia for particular researchers to be extremely well connected with other researchers in the sense that they collaborate with a wide variety of other researchers having similar (or related) interests. Additionally, many researchers collaborate with great homogeneity. By utilizing representative nodes corresponding to these well-connected nodes (e.g. popular researchers), when a recommended relationship between the representative node and the search node is identified, additional recommended relationships can be determined based the search node and those nodes connected to the representative node. This augmented recommended relationship can be directly between the search node and the additional nodes and/or a compound relationship (e.g. including the representative node) as appropriate to the requirements of specific applications of the invention.

To this end, for a motif M with a special designated node $n_M \in N(M)$ and some node $u \in N(G)$. In this case, u is said to be a representation of M if there is a subgraph $S \subset G$ with $u \in N(S)$ and an isomorphism $$S \overset{\varphi}{\cong} M$$

and $\sigma(u) = n_M$ (i.e. u is a representation of M if it corresponds to $n_M$). As described above, in many embodiments this leads to greater efficiency in the recommendation stage proportional to the ratio of the number of nodes in N(G) that represent a motif to |N(G)| by utilizing connections between a search node and the representative nodes.

Based on the potential relationships added, the resulting subgraphs can be ranked based on the representative nodes representing the subgraphs. Let r be a representative node, M be its associated motif, and s be the source node. Then $$\text{rank}(r) = \sum_{(n_i, r) \in E(M)} f^*(G'[\{r, s, n_i\}]) + f^*(G'[\{s, v_i\}])$$

where $$G' = G \cup \{rs\}.$$

By considering the potential productivities of the connections between the search node and neighbors of r, with or without r, the sum of these can be the rank of r, or, more accurately, the rank of the potential relationship (i.e. the edge) between the source node and the representative node. In many embodiments, a neighbor of r is a node within a subgraph represented by r. More generally, $$\text{rank}(r) = \sum_{M_i' \subset M} f^*(M_i) + \sum_{M_i' \subset M} f^*(M_i')$$

where the first sum ranges of motifs that include r and s and the second ranges over motifs that include only s.

Figure 7:
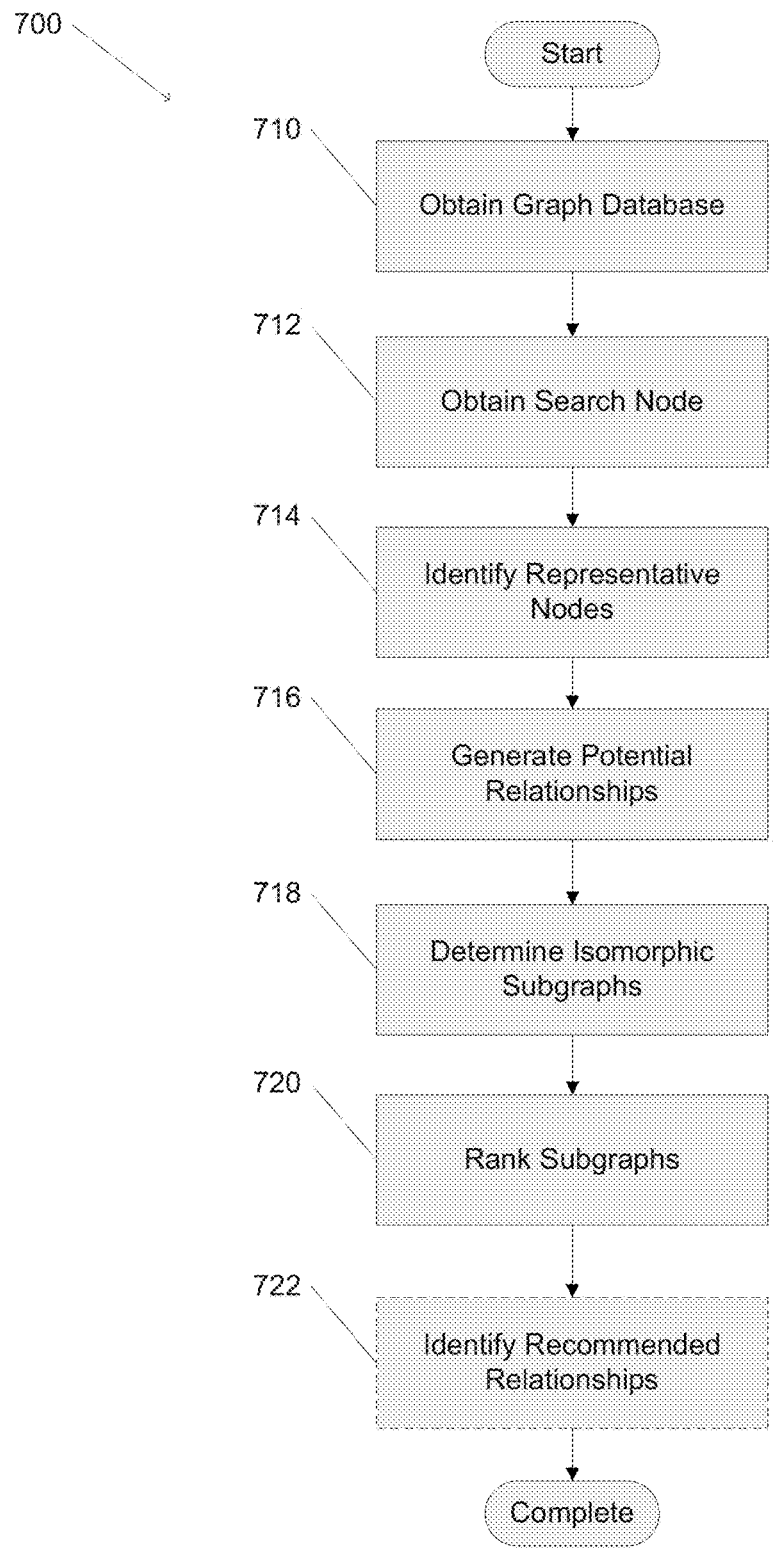
FIG. 7 is a flow chart illustrating a process for ranking potential relationships utilizing representative nodes within a graph database in accordance with an embodiment of the invention.

A process for recommending relationships utilizing representative nodes within a graph database in accordance with an embodiment of the invention is illustrated in FIG. 7. The process 700 includes obtaining (710) a graph database and (712) obtaining a search node. Representative nodes are identified (714), potential relationships are generated (716), and isomorphic subgraphs are determined (718). The subgraphs are ranked (720) and, in a number of embodiments, recommended relationships are identified (722).

Specific processes for recommending relationships utilizing representative nodes are described above with respect to FIG. 7; however, any of a variety of processes can be utilized in accordance with embodiments of the invention.

Additional Applications

In addition to those processes described above, a variety of additional techniques can be performed as appropriate to the requirements of specific applications of the invention. It should be noted that the following to presented by way of illustration only and is not limiting on the systems and techniques described above. For example, subgraphs can be ranked based on the relevance or productivity of those subgraphs as determined by its attributes in the context of the graph database as a whole. Similarly, motifs can be ranked by any of a variety of metrics, including a user-defined metric set forth via a third-party device and then obtained by a relationship recommendation server system. These metrics include, but are not limited to, finding the PageRank of the motif as a whole substructure, the influence of ideas produced by those substructures on the surrounding graph or network, the TopicFlow generated by those substructures, online social network comments (e.g. likes) generated by those motifs, the comments generated by those motifs, the ventures and importance of ventures founded by those motifs, and any other metric, including, but not limited to, those that measure the productivity, output, or influence of those motifs a quantitative means that may or may not be normalized by some other parameters. In a number of embodiments, nodes within the graph database that are unconnected to a search node can be ranked by some multiplicative, linear, and/or non-linear combination of the similarity score between the engendered substructure and an existing substructure in the motif data and the relevance of that substructure. In several embodiments, computing the similarity between a substructure formed by generating new edges from a search node to unconnected nodes and an existing substructure is performed using hidden Markov models, log-likelihood scores, graph alignments, and/or some combination thereof in order to rank the overall relevance of a generated subgraph.

In many embodiments, gene ontology or related annotation terms are utilized in determining node and edge attributes in combination with a graph database consisting of protein, gene, metabolite, or related biological. These attributed can be utilized to find statistically significantly occurring subgraphs in the graph database. Using this information, a search node can be obtained and used to augment the graph database with new edges from that search node to presently unconnected nodes, similarity of the created subgraphs to the motif data can be determined, proposed edges can be ranked using a function taking into account both statistical significance and similarity score, and previously unknown gene, protein, metabolite, or other biological molecule interaction can be predicted. In a variety of embodiments, quantitative results from microarray, RNA sequencing, immunohistochemistry, or other related biochemical assays can be used to augment the assignment of attributes to nodes and edges in the gene, protein, or metabolite interactions described in the graph database. This data can be used to predict previously unknown interactions between genes in the graph database. Additionally, a number of topic modeling techniques including, but not limited to, Latent Dirichlet Allocation, can be utilized to categorize the gene ontology or related annotation terms assigned as attributes to the nodes and edges in the graph database. In several embodiments, processes to improve the computational efficiency of determining which trial edges to generate between the search node and presently unconnected nodes can be employed. These processes include, but are not limited to, determining which attribute or set of attributes associated with a newly connected node and edge would lead to the greatest increase in productivity or relevance by some metric, identifying the node and edge combination that together are most similar to having this set of attributes, and iteratively continuing the described process by finding nodes that, when connected to the search node, could engender the greatest increase in productivity. A discrete version of the steepest ascent, or gradient ascent, method of optimizing/maximizing an objective function can be employed, where, for example, the objective function is the productivity of the subgraph and each iteration involves adding an additional node and edge pair to the search node's subgraph. In many embodiments, a set of nodes and edges that would be particularly well suited to executing a research or business plan based on the attributes of those nodes and edges are determined and, in particular, the relevance of the subgraphs comprising that set of nodes and edges within the graph database.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A relationship recommendation server system, comprising:

a processor; and a memory connected to the processor and configured to store a relationship recommendation program;

wherein the relationship recommendation program provides recommendations for collaborative relationships by directing the processor to:

obtain a graph database, where:

the graph database comprises a set of nodes comprising node attribute data and a set of edges comprising edge attribute data; and edges in the set of edges describe relationships between nodes in the set of nodes;

determine a set of motif data by:

determining a set of subgraphs of the graph database, a subgraph of the set of subgraphs comprising at least two nodes and at least one edge within the graph database, the at least one edge connecting the at least two nodes;

identifying a subset of the set of subgraphs based on a set of similarity scores and a frequency of matching subgraphs exceeding a threshold, wherein a match is decided using a similarity score based on node attribute data of the at least two nodes and edge attribute data of the at least one edge, and the subgraphs of the identified subset representing beneficial relationship patterns, wherein a beneficial relationship pattern indicates that nodes with certain node attributes have a relationship that yields a pattern of success, the success being dependent on the relationship; and utilizing the identified subset of subgraphs as the motif data;

obtain a search node n;

determine a subset of motif data using an evaluation function $f^*$ defined as $$f^*(S_i) = f(S_i)Z(S_i),$$

where $f(S_i)$ maps subgraph $S_i$ to a productivity metric, and $Z(S_i)$ represents a statistical significance of $S_i$;

generate additional edges between the search node n and a subset of the nodes within the graph database, where the additional edges form new subgraphs comprising the search node n that are isomorphic to the subset of the motif data, wherein the additional edges are generated based on node and edge attribute data;

rank the new subgraphs using a ranking function $rank_n$ defined as $$\text{rank}_n(u) = \Sigma_i f^*(S_i^u)/d(S_i^u, S_i),$$

where u represents a node distinct from search node n, $S_i^u$ represents a set of subgraphs including $S_i$ and the new subgraphs, and $d(S_i^u, S_i)$ represents a similarity score for isomorphic subgraphs $S_i^u$ and $S_i$; and recommend relationships based on the generated additional edges and similarity of the subgraphs resulting from the generated additional edges to beneficial relationship patterns.

2. The relationship recommendation server system of claim 1, wherein the relationship recommendation application further configures the processor to augment the graph database by incorporating a portion of the additional edges into the set of edges.

3. The relationship recommendation system of claim 1, wherein:
the relationship recommendation server system further comprises a network interface connected to the processor and configured to communicate via a network; and
the relationship recommendation application further configures the processor to obtain source data using the network interface, where the source data describes a collaborative environment comprising a set of entities and a set of relationships describing the relationships between the entities in the set of entities.

4. The relationship recommendation server system of claim 3, wherein the relationship recommendation application further configures the processor to generate the graph database based on the obtained source data by:
generating a set of node data based on the set of entities in the source data;
generating a set of edge data based on the set of relationships in the source data, where an edge in the set of edge data comprises a relationship between nodes in the set of node data; and
creating a graph database comprising the set of node data and the set of edge data.

5. The relationship recommendation server system of claim 3, wherein the relationship recommendation application further configures the processor to augment the graph database based on the obtained source data by:
generating a set of additional node data based on the set of entities in the source data;
generating a set of additional edge data based on the set of relationships in the source data, where an edge in the set of additional edge data comprises a relationship between nodes; and
incorporating the set of additional node data and the set of additional edge data into the obtained graph database.

6. The relationship recommendation server system of claim 1, wherein the threshold value is based on the statistical significance of the occurrence of the subset of the set of subgraphs within the graph database.

7. The relationship recommendation server system of claim 1, wherein the relationship recommendation application configures the processor to identify a subset of the set of subgraphs occurring with a frequency exceeding a threshold value by:
calculating the frequency with which the subgraphs in the set of subgraphs occur within the graph database;
calculating the frequency with which the subgraphs in the set of subgraphs occur within a training graph database separate from the graph database; and
determining the statistical significance of the subgraphs in the set of subgraphs based on the frequency with which the subgraphs occur within the graph database, the training graph database, and the standard deviation of the occurrences.

8. The relationship recommendation server system of claim 1, wherein the relationship recommendation application configures the processor to:
identify subgraphs within the graph database that are isomorphic to the motif data; and
include the isomorphic subgraphs within the motif data.

9. The relationship recommendation server system of claim 8, wherein the relationship recommendation application configures the processor to identify subgraphs isomorphic to a piece of motif data by:
generating isomorphic node data based on the attributes of the nodes within the subgraph;
generating isomorphic edge data based on the attributes of the edge within the subgraph;
generating isomorphic motif node data based on the attributes of the nodes within the piece of motif data;
generating isomorphic motif edge data based on the attributes of the edges within the piece of motif data; and
generating an isomorphic similarity score for the subgraphs relative to the piece of motif data based on the isomorphic node data, the isomorphic edge data, the isomorphic motif node data, and the isomorphic motif edge data.

10. The relationship recommendation server system of claim 9, wherein the identification of a subgraph included in the set of subgraphs is based on the isomorphic similarity score and a statistical significance of the subgraph within the graph database.

11. The relationship recommendation server system of claim 1, wherein the relationship recommendation application further configures the processor to:
recommend those relationships corresponding to the additional edges forming subgraphs that have a rank exceeding a threshold value.

12. The relationship recommendation server system of claim 11, wherein the relationship recommendation application configures the processor to rank a subgraph based on the attributes of the set of node data and the attributes of the set of edge data for the set of node data and the set of edge data in the subgraph.

13. The relationship recommendation server system of claim 11, wherein the recommended relationship corresponds to the subgraph having the highest rank.

14. The relationship recommendation server system of claim 1, wherein the relationship recommendation application further configures the processor to:
identify a representative node within the graph database, where a representative node corresponds to a subgraph occurring within the graph database; and
a portion of the motif data comprises subgraphs including the representative node.

15. The relationship recommendation server system of claim 14, wherein:
the representative node comprises a set of representative edges between the representative node and a subset of the nodes within the subgraph corresponding to the representative node; and
the recommended relationships comprise relationships between the source node and a node within the subgraph corresponding to the representative node based on the set of representative edges.

16. The relationship recommendation server system of claim 14, wherein the recommended relationships comprise at least one relationship between the source node and the representative node.

17. A method for provides recommendations for collaborative relationships relationships, comprising:
obtaining a graph database using a relationship recommendation server system, where:
the graph database comprises a set of nodes comprising node attribute data and a set of edges comprising edge attribute data; and
edges in the set of edges describe relationships between nodes in the set of nodes;
determining a set of motif data using the relationship recommendation server system by:
determining a set of subgraphs of the graph database using the relationship recommendation server system, a subgraph of the set of subgraphs comprising at least two nodes and at least one edge within the graph database, the at least one edge connecting the at least two nodes;
identifying a subset of the set of subgraphs using the relationship recommendation server system based on a set of similarity scores and a frequency of matching subgraphs exceeding a threshold, wherein a match is decided using a similarity score based on node attribute data of the at least two nodes and edge attribute data of the at least one edge, and the subgraphs of the identified subset representing beneficial relationship patterns, wherein a beneficial relationship pattern indicates that nodes with certain node attributes have a relationship that yields a pattern of success, the success being dependent on the relationship; and
utilizing the identified subset of subgraphs as the motif data using the relationship recommendation server system;
obtaining a search node n using the relationship recommendation server system;
determining a subset of motif data using an evaluation function $f^*$ defined as $$f^*(S_i) = f(S_i)Z(S_i),$$

where $f(S_i)$ maps subgraph $S_i$ to a productivity metric, and $Z(S_i)$ represents a statistical significance of $S_i$;
generating additional edges between the search node n and a subset of the nodes within the graph database using the relationship recommendation server system, where the additional edges form new subgraphs including the search node n that are isomorphic to the subset of the motif data, wherein the additional edges are generated based on node and edge attribute data;
ranking the new subgraphs using a ranking function $rank_n$ defined as $$rank_n(u) = \Sigma_i f^*(S_i^u)/d(S_i^u, S_i),$$

where u represents a node distinct from search node n, $S_i^u$ represents a set of subgraphs including $S_i$ and the new subgraphs, and $d(S_i^u, S_i)$ represents a similarity score for isomorphic subgraphs $S_i^u$ and $S_i$; and
recommending relationships based on the generated additional edges and similarity of the subgraphs resulting from the generated additional edges to beneficial relationship patterns using the relationship recommendation server system.

18. The method of claim 17, further comprising:
obtaining source data using the relationship recommendation server system, where the source data describes a collaborative environment comprising a set of entities and a set of relationships describing the relationships between the entities in the set of entities; and
generating the obtained graph database based on the obtained source data using the relationship recommendation server system.

19. The method of claim 17, further comprising:
recommending those relationships corresponding to the additional edges forming subgraphs that have a rank exceeding a threshold value using the relationship recommendation server system.

20. The method of claim 17, further comprising identifying a representative node within the graph database using the relationship recommendation server system, where a representative node corresponds to a subgraph occurring within the graph database and a portion of the motif data comprises subgraphs including the representative node.

* * * * *